United States Patent
Ikeda et al.

(10) Patent No.: US 12,198,271 B2
(45) Date of Patent: Jan. 14, 2025

(54) MULTI-RESOLUTION GEOMETRIC REPRESENTATION USING BOUNDING VOLUME HIERARCHY FOR RAY TRACING

(71) Applicants: Advanced Micro Devices, Inc., Santa Clara, CA (US); ATI Technologies ULC, Markham (CA)

(72) Inventors: Sho Ikeda, Tokyo (JP); Paritosh Vijay Kulkarni, Markham (CA); Takahiro Harada, Santa Clara, CA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 132 days.

(21) Appl. No.: 17/955,490

(22) Filed: Sep. 28, 2022

(65) Prior Publication Data
US 2024/0104844 A1   Mar. 28, 2024

(51) Int. Cl.
*G06T 17/10*    (2006.01)
*G06T 15/06*    (2011.01)
*G06T 17/00*    (2006.01)

(52) U.S. Cl.
CPC .............. *G06T 17/10* (2013.01); *G06T 15/06* (2013.01); *G06T 17/005* (2013.01); *G06T 2210/12* (2013.01); *G06T 2210/21* (2013.01)

(58) Field of Classification Search
CPC ....... G06T 17/10; G06T 17/005; G06T 15/06; G06T 2210/12; G06T 2210/21
USPC ................................. 345/418, 419, 421, 423
See application file for complete search history.

(56) References Cited

U.S. PATENT DOCUMENTS

| | | | |
|---|---|---|---|
| 2002/0030677 A1* | 3/2002 | Huang | G06T 17/20 345/423 |
| 2004/0125103 A1* | 7/2004 | Kaufman | G06T 15/08 345/419 |
| 2010/0289799 A1* | 11/2010 | Hanika | G06T 17/20 345/421 |
| 2012/0075300 A1* | 3/2012 | Hur | H04M 1/6058 345/419 |
| 2020/0051315 A1* | 2/2020 | Laine | G06T 17/005 |
| 2021/0390755 A1* | 12/2021 | Muthler | G06T 15/005 |

(Continued)

OTHER PUBLICATIONS

Lee, Won-Jong, et. al., "Flexible Ray Traversal with an Extended Programming Model", SA '19: SIGGRAPH Asia 2019 Technical Briefs, Nov. 2019, 4 pgs.

(Continued)

*Primary Examiner* — Prabodh M Dharia
(74) *Attorney, Agent, or Firm* — Volpe Koenig (57) ABSTRACT

Devices and methods for multi-resolution geometric representation for ray tracing are described which include casting a ray in a space comprising objects represented by geometric shapes and approximating a volume of the geometric shapes using an accelerated hierarchy structure. The accelerated hierarchy structure comprises first nodes each representing a volume of one of the geometric shapes in the space and second nodes each representing an approximate volume of a group of the geometric shapes. When the ray is determined to intersect a bounding box of a second node representing one group of the geometric shapes, a selection is made between traversal and non-traversal of other second nodes based on a LOD for representing the volume of the one group of geometric shapes.

20 Claims, 6 Drawing Sheets

(56) References Cited

U.S. PATENT DOCUMENTS

2023/0081791 A1* 3/2023 Burgess .................. G06T 17/20
                                                        345/418
2024/0020911 A1* 1/2024 Norris ....................... G06T 1/60

OTHER PUBLICATIONS

Lloyd, Brandon, et. al., "Implementing Stochastic Levels of Detail with Microsoft DirectX Raytracing", Jun. 20, 2020, 5 pgs., downloaded from https://developer.nvidia.com/blog/implementing-stochastic-lod-with-microsoft-dxr/ on Sep. 27, 2022.

* cited by examiner

MULTI-RESOLUTION GEOMETRIC REPRESENTATION USING BOUNDING VOLUME HIERARCHY FOR RAY TRACING

BACKGROUND

Ray tracing is a type of graphics rendering technique in which simulated rays of light are cast to test for object intersection and pixels are illuminated and colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

Typically, a scene (e.g., objects in a scene) is represented by a number of geometric shapes (e.g., primitives defining polygons). Because triangles are the most common geometric shape used to represent objects in a scene, for simplified explanation purposes, geometric shapes are described herein as triangles. Features of the present disclosure can be implemented, however, using any geometric shape to represent objects in a scene.

Ray tracing renders a three dimensional (3D) scene by casting (i.e. shooting) a simulated light ray from a point of origin in a 3D space of a scene and testing whether the ray intersects an object (e.g., a triangle representing a portion of an object) in a scene. Ray tracing can be used to determine the presence of objects and a variety of characteristics of objects in a scene, such as for example, the distance between an intersection and a point of origin (e.g., the distance between an object and the point of origin), the location (in a 3D space) of objects in a scene, the physical characteristics (e.g., size, shape, luminance and color) of objects in a scene, and whether light is being obstructed (e.g., a first object, located between a second object and a light source, casts a shadow on the second object).

Separate rays can be cast on each triangle in a scene to determine the presence and characteristics of objects. However, each ray intersection test is complex and expensive in terms of processing resources and, therefore, the computational cost of ray tracing is high for real-time applications. Accordingly, accelerated hierarchy structures, such as a bounding volume hierarchy (BVH) are used to implement ray tracing more efficiently to make accurate determinations.

For simplified explanation purposes, features of the present disclosure are described herein using BVHs as examples of hierarchy accelerated data structures. Features of the present disclosure can be implemented, however, using other types of hierarchy accelerated data structures used to represent objects (e.g., volume of objects) within a scene for implementing ray tracing.

For example, as described in further detail herein, in a BVH accelerated data structure, numbers of triangles are grouped together (e.g., by a bounding box) and multiple hierarchies (i.e., hierarchy levels) of triangles (or groups of triangles) are created. The bounding volume hierarchy data structure allows the number of ray-triangle intersections to be reduced as compared with a scenario in which no such data structure was used and therefore all triangles in a scene would have to be tested against the ray. Specifically, if a ray does not intersect a particular bounding box, and that bounding box bounds a large number of triangles, then each triangle in that box can be eliminated from the test. Thus, a ray intersection test is performed as a sequence of tests of the ray against axis-aligned bounding boxes (AABBs), followed by tests against triangles.

In a simplified example, if 4 triangles are grouped together for testing, a hierarchy tree can be created which includes 3 separate hierarchical levels. In this example, the first level includes the group of 4 triangles (each represented by a first level node (e.g., leaf node)). The second level includes 2 separate groups of 2 triangles branched off of the group of 4 triangles, with 1 group represented by 2 of the 4 triangles and the other group represented by the 2 other triangles. The third level includes the 4 individual triangles, with the first and second triangles branching off of the first group of triangles in the second level and the third and fourth triangles branching off of the second group of triangles in the second level. The first and second levels include nodes (e.g., non-leaf node bounding the volume of the 4 triangles).

During conventional regular ray traversal, when a ray intersects an AABB of a higher level node (e.g., non-leaf node), the ray continues traversal within that AABB until it reaches a leaf node. For example, a ray is first tested (e.g., cast) between a point of origin (e.g., in a 3D space) and the group of 4 triangles (i.e., the first level). If it is determined that the ray intersects one of the 4 triangles, but not the other 3 triangles, the ray intersection test would first test against the highest level non-leaf node which bounds the volume of the triangle in which the ray is determined to intersect. Traversal of sub-nodes of the non-leaf node is ether aborted or continues depending on whether or not a hit occurs on an AABB of the highest level non-leaf node. When there is no hit on an AABB of the highest level non-leaf node (i.e., no object detected), the test would eliminate all sub-nodes of the non-leaf node and no further ray tracing is performed on the group of 4 triangles. When there is a hit on an AABB of the highest level non-leaf node (i.e., an object is detected), the testing proceeds to testing on the nodes of the next lower level. The process then repeats for each level until the testing reaches a leaf node.

Accordingly, a determination of which triangles (representing an object) are "hit" by a cast ray can be made without testing all the triangles the second group of triangles in the second level or the third and fourth triangles in the third level. For example, in the above, a determination of the triangles hit by a cast ray is made using 4 tests (i.e., 2 ray/box tests and 2 ray/triangle tests) for 4 triangles. However, as can be appreciated, when a larger group of triangles is tested using a BVH, many more groups of triangles may be eliminated from testing. Accordingly, as the number of triangles in a testing region increases, a BVH typically reduces the total number of tests to be performed for the region (e.g., 10 tests for 1000 triangles) and ray tracing is implemented more efficiently while maintaining accuracy.

Despite the use of a hierarchy accelerated structure (e.g., BVH) to implement ray tracing more efficiently, conventional ray tracing techniques are still not efficient and do not work well with full ray casting for complex images (e.g., complex materials of objects in an image).

For example, some conventional ray tracing techniques select a different level of detail (LOD) (e.g., level of complexity of pixel data representing objects in a three dimensional (3D) space) for each object, based on the object's distance to the camera. Objects further from the camera use lower resolution meshes while objects closer to the camera use higher resolution meshes. That is, LOD meshes are explicitly modeled for each object and switched between different objects. However, the object's distance to the camera (i.e., LOD parameter) cannot be changed after it has been determined. Accordingly, the LOD parameter must be re-computed for each object. Other conventional ray tracing techniques create multiple hierarchy accelerated data structures to estimate the geometric primitives of a geometric shape (e.g., a triangle). Accordingly, the data for each hierarchy accelerated structure is stored and read from memory to estimate the geometric primitives of the geometric shape, which is inefficient.

Features of the present disclosure provide an efficient multi-resolution geometric representation for ray tracing using a single hierarchy accelerated data structure (e.g., BVH) of the geometry, which reduces the computational complexity in ray casting without any re-computation or storage of data for multiple accelerated data structures used in conventional techniques. Instead of explicitly modeling and switching between different LOD meshes (i.e., between lower resolution and higher resolution meshes) for each object, features of the present disclosure utilize the existing hierarchy accelerated data structure (e.g., BVH) to approximate the geometry. That is, a multi-resolution geometric representation (e.g., multiple LODs) is performed by approximating a distance between a ray origin and an object by using the volume of a bounding box of a node which bounds the volume of the geometry. A geometric LOD is implemented by uniquely modifying the conventional BVH traversal algorithm. Stochastic material sampling is used to evaluate materials at any LOD level of the geometry. In addition, an LOD is selected for a ray at runtime, providing flexibility on the LOD selection, which is not afforded by conventional techniques. Features of the present disclosure are also well suited for general purpose ray tracing, including complex effects (e.g., refraction, reflection) and materials in a scene.

A method of multi-resolution geometric representation for ray tracing is provided which comprises casting a ray in a space comprising one or more objects represented by geometric shapes and approximating a volume of the geometric shapes using an accelerated hierarchy structure. The accelerated hierarchy structure comprises first nodes each representing a volume of one of the geometric shapes in the space and second nodes each representing an approximate volume of a group of the geometric shapes in the space, and when the ray is determined to intersect a bounding box of a second node representing one group of the geometric shapes, selecting between traversal and non-traversal of other second nodes based on a LOD for representing the volume of the one group of geometric shapes.

A processing device for multi-resolution geometric representation for ray tracing is provided which comprises memory and a processor configured to cast a ray in a space comprising one or more objects represented by geometric shapes and approximate a volume of the geometric shapes using an accelerated hierarchy structure. The accelerated hierarchy structure comprises first nodes each representing a volume of one of the geometric shapes in the space and second nodes each representing an approximate volume of a group of the geometric shapes in the space. When the ray is determined to intersect a bounding box of a second node representing one group of geometric shapes, the processor is configured to select between traversal and non-traversal of other second nodes based on a LOD for representing the volume of the one group of geometric shapes.

A non-transitory computer readable medium is provided which includes instructions for causing a computer to execute a method of multi-resolution geometric representation for ray tracing. The instructions comprise casting a ray in a space comprising one or more objects represented by geometric shapes and approximating a volume of the geometric shapes using an accelerated hierarchy structure. The accelerated hierarchy structure comprises first nodes each representing a volume of one of the geometric shapes in the space and second nodes each representing an approximate volume of a group of the geometric shapes in the space and when the ray is determined to intersect a bounding box of a second node representing one group of the geometric shapes, selecting between traversal and non-traversal of other second nodes based on a LOD for representing the volume of the one group of geometric shapes.

Figure 1:
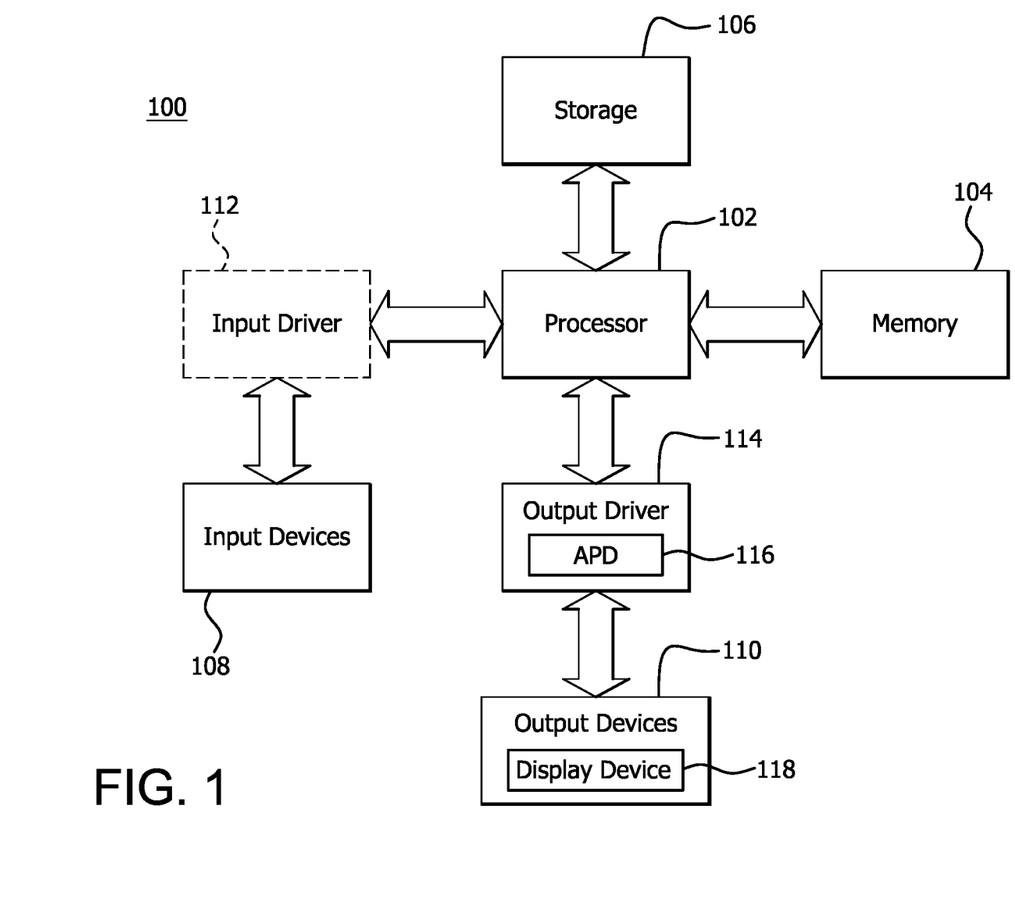
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a display connector/interface (e.g., an HDMI or DisplayPort connector or interface for connecting to an HDMI or DisplayPort compliant device), a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
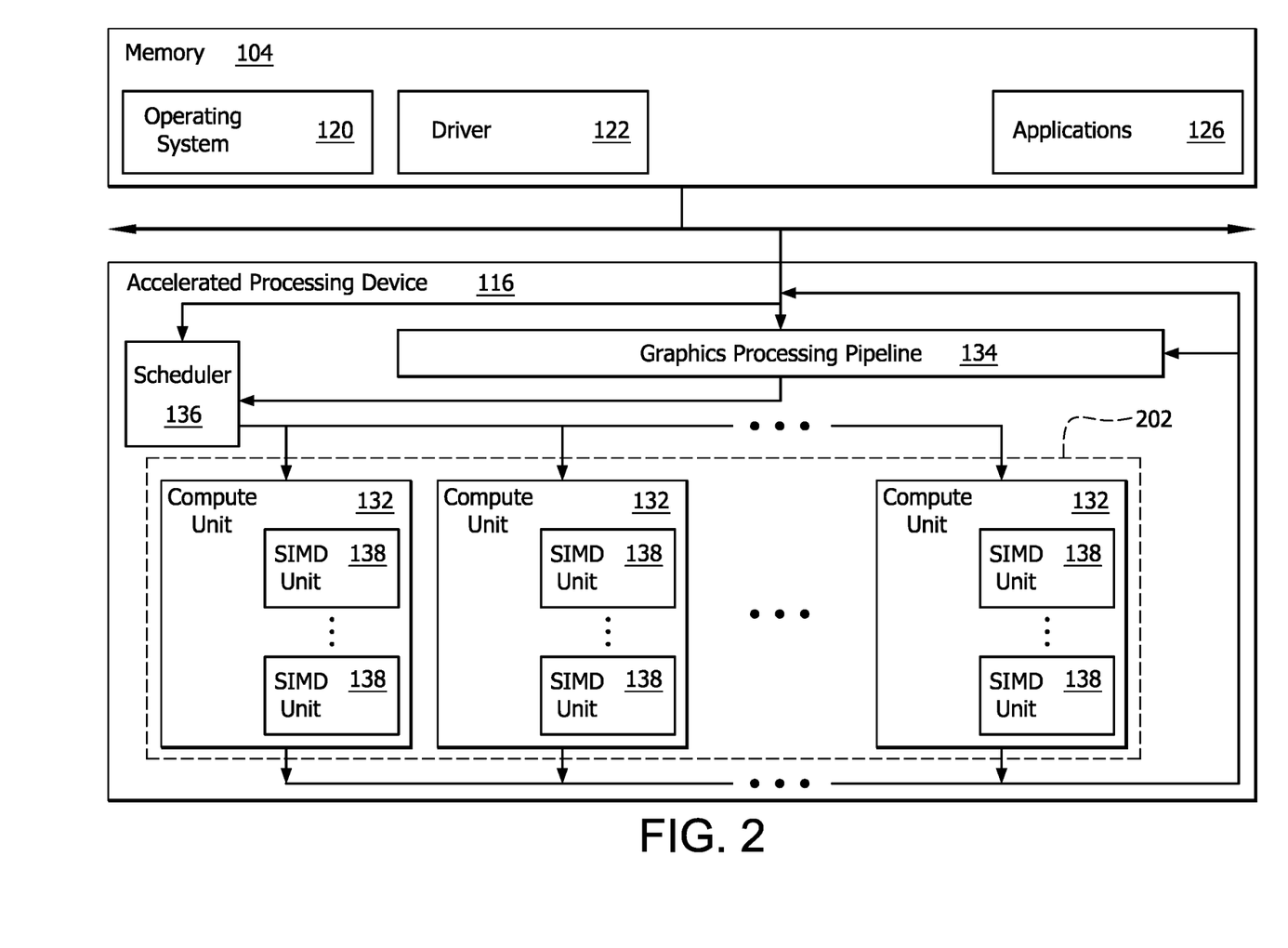
FIG. 2 is a block diagram of the device, illustrating additional details related to execution of processing tasks on the accelerated processing device of FIG. 1, according to an example.

FIG. 2 is a block diagram of aspects of device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 (collectively "compute units 202") that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" (also "waves") on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations and non-graphics operations (sometimes known as "compute" operations). Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
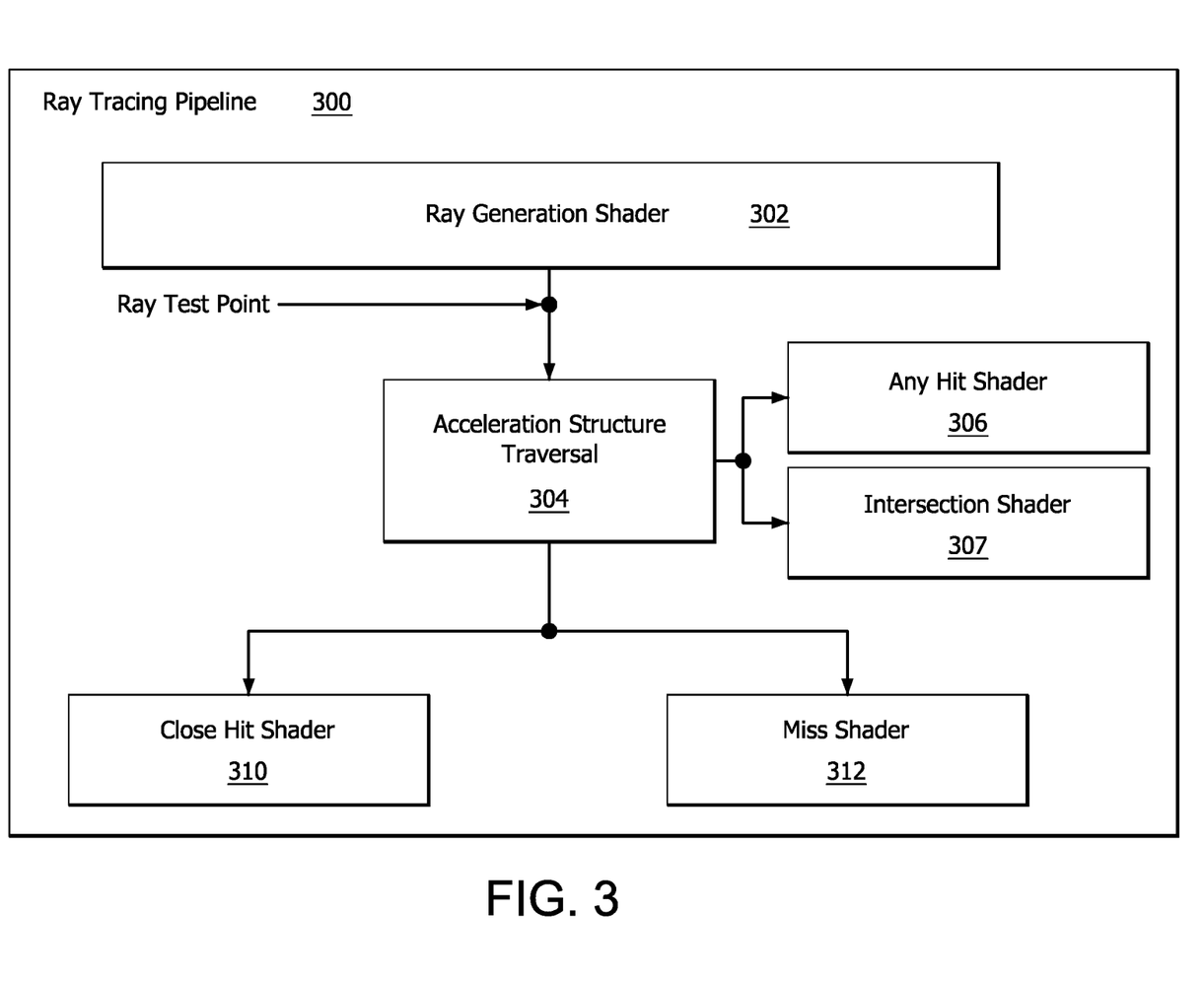
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, intersection shader 307, closest hit shader 310, and miss shader 312 are shader-implemented stages that represent ray tracing pipeline stages whose functionality is performed by shader programs executing on the SIMD unit 138. Any of the specific shader programs at each particular shader-implemented stage are defined by application-provided code (i.e., by code provided by an application developer that may pre-compiled by an application compiler and/or compiled by the driver 122). It should be noted that in variations, these stages can be implemented using specialized, fixed function or programmable circuitry. The acceleration structure traversal stage 304 performs the ray intersection test to determine whether a ray hits a triangle. The other programmable shader stages (ray generation shader 302, any hit shader 306, closest hit shader 310, miss shader 312) are implemented as shader programs that execute on the SIMD units 138. The acceleration structure traversal stage may be implemented in software (e.g., as a shader program executing on the SIMD units 138), in hardware, or as a combination of hardware and software. The ray tracing pipeline 300 may be orchestrated partially or fully in software or partially or fully in hardware, and may be orchestrated by the processor 102, the scheduler 136, by a combination thereof, or partially or fully by any other hardware and/or software unit. In examples, traversal through the ray tracing pipeline 300 is performed partially or fully by the scheduler 136, either autonomously or under control of the processor 102, or partially or fully by a shader program (such as a BVH traversal shader program) executing on one or more of the SIMD units 138. In some examples, testing a ray against boxes and triangles (inside the acceleration structure traversal stage 304) is hardware accelerated (meaning that a fixed function hardware unit performs the steps for those tests). In other examples, such testing is performed by software such as a shader program executing on one or more SIMD units 138. Herein, where the phrase "the ray tracing pipeline does [a task]" is used, this means that the hardware and/or software that implements the ray tracing pipeline 300 does that task.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects within the scene, and tests the ray against triangles in the scene. During this traversal, for triangles that are intersected by the ray, the ray tracing pipeline 300 triggers execution of an any hit shader 306 and/or an intersection shader 307 if those shaders are specified by the material of the intersected triangle. Note that multiple triangles can be intersected by a single ray. It is not guaranteed that the acceleration structure traversal stage will traverse the acceleration structure in the order from closest-to-ray-origin to farthest-from-ray-origin. The acceleration structure traversal stage 304 triggers execution of a closest hit shader 310 for the triangle closest to the origin of the ray that the ray hits, or, if no triangles were hit, triggers a miss shader.

Note, it is possible for the any hit shader 306 or intersection shader 307 to "reject" an intersection from the acceleration structure traversal stage 304, and thus the acceleration structure traversal stage 304 triggers execution of the miss shader 312 if no intersections are found to occur with the ray or if one or more intersections are found but are all rejected by the any hit shader 306 and/or intersection shader 307. An example circumstance in which an any hit shader 306 may "reject" a hit is when at least a portion of a triangle that the acceleration structure traversal stage 304 reports as being hit is fully transparent. Because the acceleration structure traversal stage 304 only tests geometry, and not transparency, the any hit shader 306 that is invoked due to an intersection with a triangle having at least some transparency may determine that the reported intersection should not count as a hit due to "intersecting" a transparent portion of the triangle. A typical use for the closest hit shader 310 is to color a ray based on a texture for the material. A typical use for the miss shader 312 is to color a ray with a color set by a skybox. It should be understood that the shader programs defined for the closest hit shader 310 and miss shader 312 may implement a wide variety of techniques for coloring ray and/or performing other operations.

A typical way in which ray generation shaders 302 generate rays is with a technique referred to as backwards ray tracing. In backwards ray tracing, the ray generation shader 302 generates a ray having an origin at the point of the camera (i.e., the eye of the viewer). The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel.

It is possible for any of the any hit shader 306, intersection shader 307, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray intersects an object is referred to herein as a "ray intersection test." The ray intersection test involves shooting a ray from an origin and determining whether the ray intersects a triangle and, if so, what distance from the origin the triangle intersection is at. For efficiency, the ray tracing test uses a representation of space referred to as a bounding volume hierarchy. This BVH is the "acceleration structure" referred to elsewhere herein. In a BVH, each non-leaf node represents an AABB that bounds the geometry of all children of that node. In an example, the base node represents the maximal extents of an entire region for which the ray intersection test is being performed. In this example, the base node has two children that each represent mutually exclusive AABBs that subdivide the entire region. Each of those two children has two child nodes that represent AABBs that subdivide the space of their parents, and so on. Leaf nodes represent a triangle or other geometry against which a ray intersection test can be performed.

The BVH data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against AABBs, followed by tests against triangles.

Figure 4:
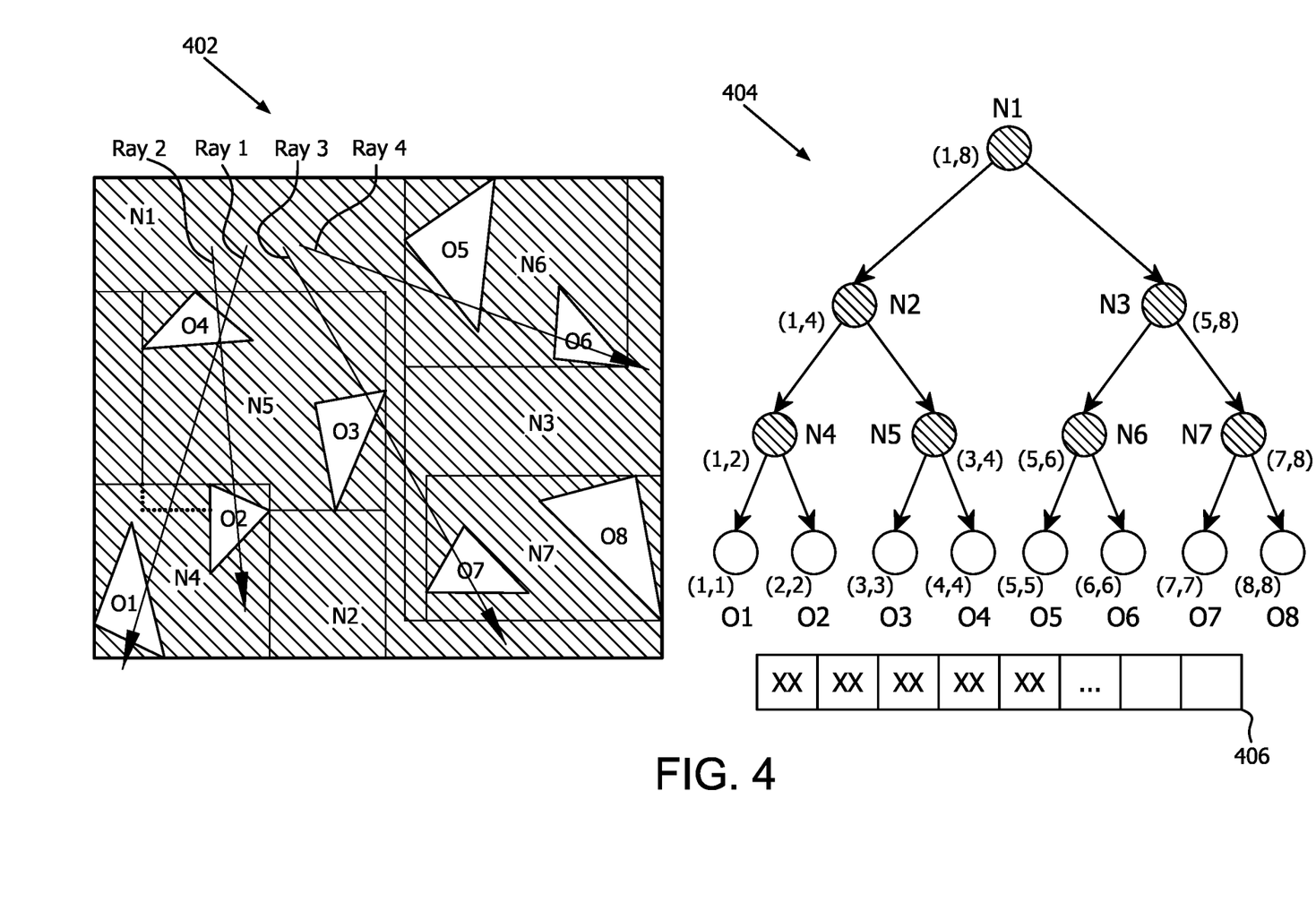
FIG. 4 is an illustration of a bounding volume hierarchy, according to an example.

FIG. 4 is an illustration of a BVH, according to an example. For simplicity, the hierarchy is shown in 2 dimensions. However, extension to 3 dimensions is simple, and it should be understood that the tests described herein would generally be performed in three dimensions.

The spatial representation 402 of the BVH is illustrated in the left side of FIG. 4 and the tree representation 404 of the BVH is illustrated in the right side of FIG. 4. The non-leaf nodes are represented with the letter "N" and the leaf nodes are represented with the letter "O" in both the spatial representation 402 and the tree representation 404.

A conventional ray intersection test for tree representation 404 would be performed by traversing through the tree 404, and, for each non-leaf node tested, eliminating branches below that node if the test for that non-leaf node fails. However, when a ray intersects an AABB (i.e., if the test for a non-leaf node succeeds), conventional ray traversal algorithms will continue traversal within the AABB until the test reaches a leaf node. For example, if the ray intersects $O_5$ but no other triangle, the conventional ray intersection test would test against $N_1$, determining that a ray intersects an AABB (i.e., the test succeeds for $N_1$). The test would test against $N_2$, determining that the test fails (since $O_5$ is not within $N_2$) and the test would eliminate all sub-nodes of $N_2$. Because the test against $N_1$ resulted in a determination that the ray intersected an AABB, traversal would continue to the child nodes of $N_1$, and would test against $N_3$, determining that a ray intersects an AABB (i.e., the test succeeds). Because the test against $N_3$ resulted in a determination that the ray intersected an AABB, traversal would again continue to the child nodes of $N_3$, and would test $N_6$ and $N_7$, determining that $N_6$ succeeds but $N_7$ fails. The test would test $O_5$ and $O_6$, noting that $O_5$ succeeds but $O_6$ fails. Instead of testing 8 triangle tests, two triangle tests ($O_5$ and $O_6$) and five box tests ($N_1$, $N_2$, $N_3$, $N_6$, and $N_7$) are performed.

The ray tracing pipeline 300 casts rays to detect whether the rays hit triangles and how such hits should be shaded (e.g., how to calculate levels of brightness and color of pixels representing objects) during the rendering of a 3D scene. Each triangle is assigned a material, which specifies which closest hit shader should be executed for that triangle at the closest hit shader stage 310, as well as whether an any hit shader should be executed at the any hit shader stage 306, whether an intersection shader should be executed at the intersection shader stage 307, and the specific any hit shader and intersection shader to execute at those stages if those shaders are to be executed.

Thus, in shooting a ray, the ray tracing pipeline 300 evaluates intersections detected at the acceleration structure traversal stage 304 as follows. If a ray is determined to intersect a triangle, then if the material for that triangle has at least an any hit shader or an intersection shader, the ray tracing pipeline 300 runs the intersection shader and/or any hit shader to determine whether the intersection should be deemed a hit or a miss. If neither an any hit shader or an intersection shader is specified for a particular material, then an intersection reported by the acceleration structure traversal 304 with a triangle having that material is deemed to be a hit.

Some examples of situations where an any hit shader or intersection shader do not count intersections as hits are now provided. In one example, if alpha is 0, meaning fully transparent, at the point that the ray intersects the triangle, then the any hit shader deems such an intersection to not be a hit. In another example, an any hit shader determines that the point that the ray intersects the triangle is deemed to be at a "cutout" portion of the triangle (where a cutout "cuts out" portions of a triangle by designating those portions as portions that a ray cannot hit), and therefore deems that intersection to not be a hit.

Once the acceleration structure has been fully traversed, the ray tracing pipeline 300 runs the closest hit shader 310 on the closest triangle determined to hit the ray. As with the any hit shader 306 and the intersection shader 307, the closest hit shader 310 to be run for a particular triangle is dependent on the material assigned to that triangle.

In sum, a conventional ray tracing pipeline 300 traverses the acceleration structure 304, determining which triangle is the closest hit for a given ray. The any hit shaders and intersection shaders evaluate intersections—potential hits—to determine if those intersections should be counted as actual hits. Then, for the closest triangle whose intersection is counted as an actual hit, the ray tracing pipeline 300 executes the closest hit shader for that triangle. If no triangles count as a hit, then the ray tracing pipeline 300 executes the miss shader for the ray.

Operation of a conventional ray tracing pipeline 300 is now discussed with respect to the example rays 1-4 illustrated in FIG. 4. For each of the example rays 1-4, the ray tracing pipeline 300 determines which triangles those rays intersect. The ray tracing pipeline 300 executes appropriate any hit shaders 306 and/or intersection shaders 307, as specified by the materials of the intersected triangles, in order to determine the closest hit that does not miss (and thus the closest-hit triangle). The ray tracing pipeline 300 runs the closest hit shader for that closest-hit triangle.

In an example, for ray 1, the ray racing pipeline 300 runs the closest hit shader for $O_4$ unless that triangle had an any hit shader or intersection shader that, when executed, indicated that ray 1 did not hit that triangle. In that situation, the ray tracing pipeline 300 would run the closest hit shader for $O_1$ unless that triangle had an any hit shader or intersection shader indicating that triangle was not hit by ray 1, and in that situation, the ray tracing pipeline 300 would execute a miss shader 312 for ray 1. Similar operations would occur for rays 2, 3, and 4. For ray 2, the ray tracing pipeline 300 determines that intersections occur with $O_2$ and $O_4$, executes an any hit and/or an intersection shader for those triangles if specified by the material, and runs the appropriate closest hit or miss shader. For rays 3 and 4, the ray tracing pipeline 300 determines intersections as shown (ray 3 intersects $O_3$ and $O_7$ and ray 4 intersects $O_5$ and $O_6$), executes appropriate any hit and an/or intersection shaders, and executes appropriate closest hit or miss shaders based on the results of the any hit and/or intersection shaders.

Figure 5:
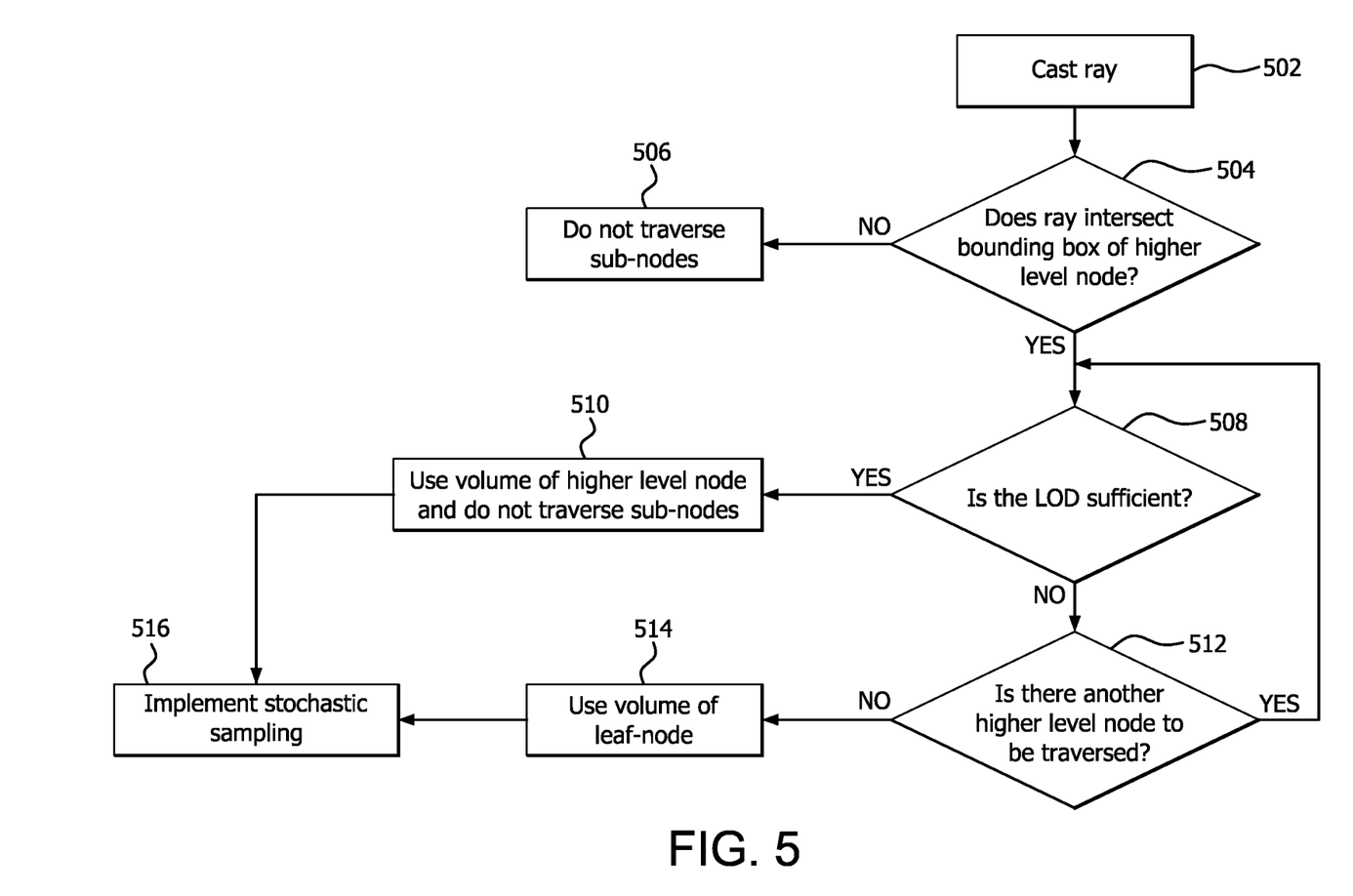
FIG. 5 is a flow diagram illustrating an example method of multi-resolution geometric representation for ray tracing according to features of the present disclosure.

FIG. 5 is a flow diagram illustrating an example method 500 of multi-resolution geometric representation for ray tracing according to features of the present disclosure. The method 500 is described using the space representation 402 and BVH tree representation 404 shown in FIG. 4.

As shown at block 502, the method 500 includes casting a ray in a space (e.g., 3D space) comprising one or more objects represented by geometric primitives of a geometric shape (e.g., 3 lines of a triangle). For example, one of the rays (Ray 1, Ray 2, Ray 3 or Ray 4 shown in FIG. 4) is cast in the space represented at 402 in FIG. 4.

As shown at decision block 504, the method 500 includes determining whether the ray intersects a bounding box of a higher level node which bounds the volume of a group of geometric shapes (e.g., the volume of the primitives defining each geometric shape, such as the volume of 3 lines defining each triangle of the group). For example, a determination is made, at decision block 504, as to whether the ray intersects an AABB of Node $N_1$, which bounds the volume of each of the 8 triangles represented by nodes $O_1$, $O_2$, $O_3$, $O_4$ $O_5$, $O_6$, $O_7$ and $O_8$.

When it is determined, at block 504, that the ray does not intersect a bounding box of a higher level node, the traversal does not continue to any of the sub-nodes (i.e., child nodes) of the higher level node. For example, if it is determined, at block 504, that the ray does not intersect the AABB of Node $N_1$ (i.e., no object detected), the traversal does not continue to any of the sub-nodes of node $N_1$, as shown at block 506.

When it is determined, at block 504, that the ray does intersect a bounding box of a higher level node, a determination is made, at decision block 508, as to whether or not a volume of a bounding box of the higher level node is of a sufficient LOD for representing a volume of the geometry. For example, if it is determined that the ray intersects an AABB of Node N1, a determination is made as to whether or not a volume of the AABB of Node N1 is of a sufficient LOD for representing a volume of the geometry (e.g., the volume of one or more of the 8 triangles represented by leaf nodes $O_1$, $O_2$, $O_3$, $O_4$, $O_5$, $O_6$, $O_7$, and $O_8$).

Lower LODs (e.g., less resolution) can be sufficient for representing objects which are more distant from a point of origin. As described above, features of the present disclosure efficient use a single hierarchy accelerated data structure (e.g., BVH) to represent the geometry. However, features of the present disclosure uniquely provide an efficient multi-resolution geometric representation (e.g., multiple LODs) of the geometry by approximating a distance between the ray origin and an object by using the volume of an AABB of a node which bounds the volume of the geometry.

Figure 6:
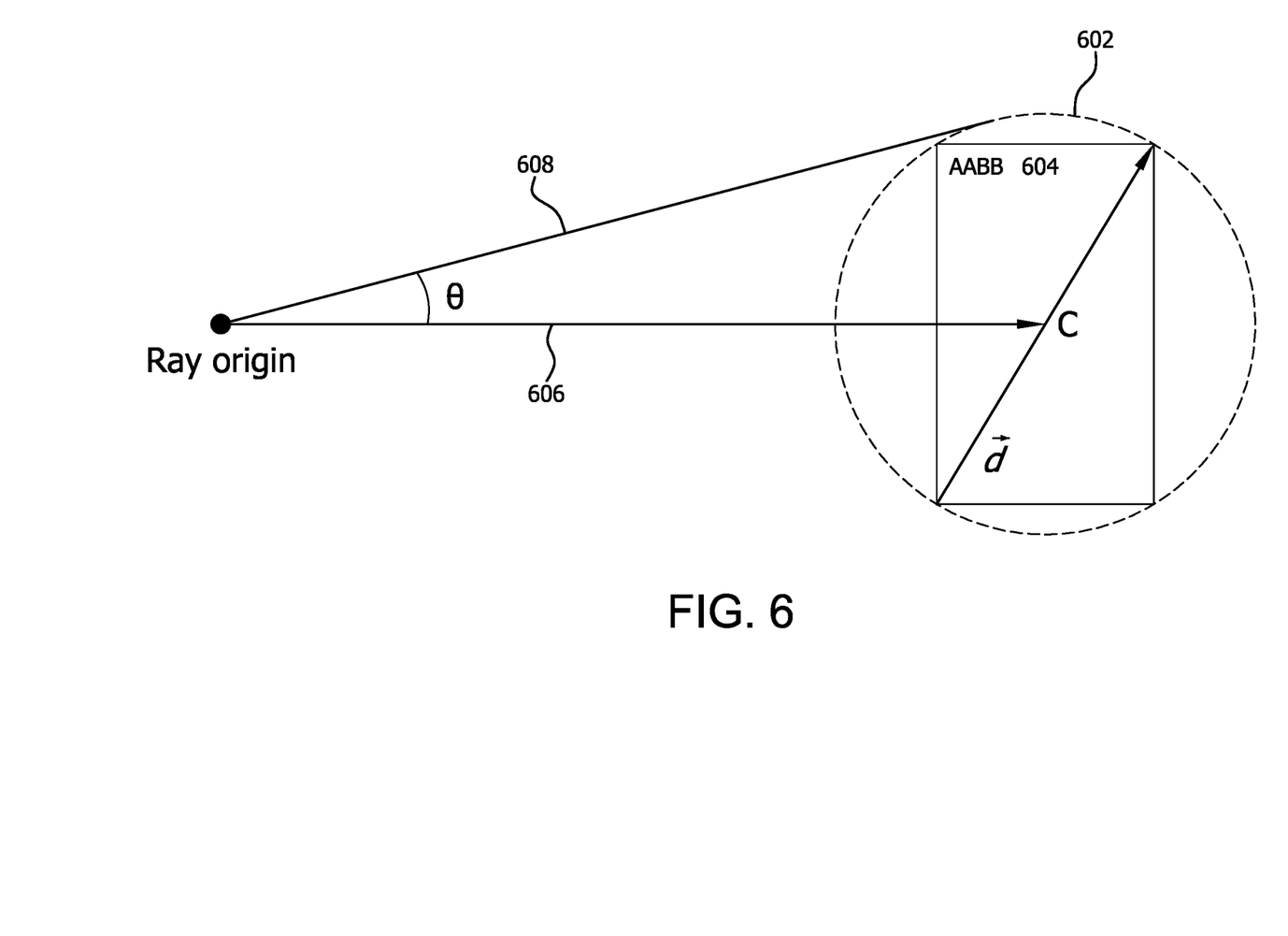
FIG. 6 is a diagram illustrating an example of determining whether a volume of a bounding box of a node is sufficient for representing a volume of the geometry bound by the node.

For example, FIG. 6 is a diagram which illustrates an example of determining whether a volume of an AABB of a node is of a sufficient LOD for representing a volume of the one or more geometric shapes (i.e., the geometry) bound by the node. The distance between the ray origin and an object is approximated from the volume of an AABB of a node which bounds the volume of the geometry. For example, as shown in FIG. 6, a sphere 602 is generated around an AAAB 604 of a node. An angle θ is determined between a first vector 606 extending from the ray origin to a center C of the sphere 602 and a second vector 608 extending from the ray origin to a point on the surface of the sphere 602.

The angle θ is determined for example using Equation 1 below:

$$\theta = \sin^{-1}(|d|/2|c|) \quad \text{Equation 1}$$

where d is the diagonal vector of the AABB and the diameter of the sphere 602. Then the angle θ is compared to a threshold angle to determine whether the volume of the AABB of a node of a sufficient LOD for representing a volume of the geometry bound by the AABB. The larger the angle, the greater the approximate distance between the ray origin and the object and, therefore, a lower LOD can be sufficient for representing a volume of the geometry that is more distant from the ray origin.

For example, using the tree representation 404 in FIG. 4, to determine whether a volume of an AABB of Node $N_1$ is of a sufficient LOD for representing a volume of the geometry, a sphere (such as sphere 602 shown in FIG. 6) is generated around the AAAB of Node $N_1$. An angle θ is determined between a first vector extending from the ray origin to a center C of the sphere and a second vector extending from the ray origin to a point on the surface of the sphere.

Then the angle θ is compared to a threshold angle. When the angle is equal to or less than the threshold angle, the volume of the AABB of Node $N_1$ is determined, at block 508, to be of a sufficient LOD for representing a volume of the geometry bound by the AABB. Accordingly, traversal of sub-nodes of Node $N_1$ is stopped, at block 510, and the data of Node $N_1$ is used to represent the volume of one or more of the 8 triangles represented by leaf nodes $O_1$, $O_2$, $O_3$, $O_4$ $O_5$, $O_6$, $O_7$ and $O_8$ in FIG. 4.

When the angle θ is greater than the angle threshold, the volume of the AABB of Node $N_1$ is determined, at block 508, not to be of a sufficient LOD for representing a volume of the geometry bound by the AABB. Accordingly, the volume (i.e., volume data) of the Node $N_1$ is not used to represent the volume of the geometry and the method proceeds to decision block 512.

The angle threshold (i.e., the LOD threshold) is for example, a user-defined threshold determined prior to runtime. Alternatively, the threshold for each ray is dynamically determined at runtime. For example, aliasing caused by approximation during ray cast from the camera strongly affects the rendered image. Therefore an approximation may not be appropriate for the primary ray cast and occlusion rays for direct illumination. On the other hand, when the traced path becomes deep, that path does not contribute much to the rendered image, but still has noticeable computation time due to incoherent rays. For such paths, the approximation can be used to accelerate ray casting. Accordingly, the angle threshold can be dynamically determined for each ray. For example, the approximation can be enabled after a first diffuse or second glossy reflection vertices. The threshold can also be modified (e.g., increased as the approximated distance increases). That is, features of the present disclosure include selecting between different levels of representation in a single mesh, such as selecting between a highest resolution (e.g., the volume data of a leaf node representing the geometry) to lower resolutions (i.e., the volume data of non-leaf nodes coarsely representing the volume of the geometry) as the approximated distance from an object to a point of interest increases.

As shown at decision block 512, a determination is made as to whether another node, which bounds the volume of the geometry, is to be traversed. For example, traversal continues to Node $N_2$ or Node $N_3$ and the same process described above. At decision block 508, is repeated for Node $N_2$ or Node $N_3$ to determine whether a volume of the AABB of Node $N_2$ or Node $N_3$ is of a sufficient LOD for representing a volume of the geometry bound by their corresponding AABBs. The process repeats to lower level nodes when a parent node is determined to not represent the geometry. If each of the higher level nodes are determined to not represent the geometry, the volume of a leaf node is used as the volume, as shown at block 514, That is, features of the present disclosure do not automatically continue traversing each node which bounds the geometry until a leaf node is reached, as performed in conventional traversal techniques. Instead, a decision for determining whether or not to continue traversal is based on whether or not a higher level node is sufficient for representing a volume of the geometry bound by the AABB of a corresponding higher level node.

Although determining the intersection point and approximating the volume of the geometry can be efficiently performed, as described above, for occlusion rays, the approximation is not typically sufficient for use in path tracing. Storing the material at a node is not efficient in rendering, where blending of materials is common. The blending of materials is not efficient for cases where a Bidirectional Reflectance Distribution Function BRDF is used in descendants with a large variety of different materials, or where complex shading networks are involved. Another problem with this approach is the memory overhead required to store BRDFs with multiple parameters.

Accordingly, as shown at block 516, stochastic material sampling is implemented to efficiently select the material (e.g., color and brightness values) of the geometry for shading.

The stochastic material sampling is performed to efficiently select the material of the geometry by using integer values (e.g., two integer values) stored for each node, which can be precomputed by traversing the tree a single time. The range of the triangle indices of a node's descendants are stored in memory.

For example, as shown in FIG. 4, each node is identified via a node identifier, which includes 2 integer values (shown in parentheses next to each node in FIG. 4). The two integer values of the node identifiers correspond to a range of index values in memory used to store the material data of the first triangle and last triangle represented by a node.

For example, the node identifier (1,8) for Node $N_1$ corresponds to the range of index values (index value 1 to index value 8) used to store the material data ranging from the first triangle (corresponding to leaf node $O_1$) to the last triangle (triangle 8 corresponding to leaf node $O_8$) represented by Node $N_1$. The node identifier (1,4) for Node $N_2$ corresponds to the range of index values (index value 1 to index value 4) used to store the material data ranging from the first triangle (triangle 1 corresponding to leaf node $O_1$) and the last triangle (triangle 4 corresponding to leaf node $O_4$) represented by Node $N_1$. The node identifier (1,2) for Node $N_4$ corresponds to the range of index values (index value 1 to index value 2) used to store the material data ranging from the first triangle (triangle 1 corresponding to leaf node $O_1$) and the last triangle (triangle 2 corresponding to leaf node $O_2$) represented by Node $N_4$. The node identifier (3,4) for Node $N_5$ corresponds to the range of index values (index value 3 to index value 4) used to store the material data ranging from the first triangle (triangle 3 corresponding to leaf node $O_3$) and the last triangle (triangle 4 corresponding to leaf node $O_4$) represented by Node $N_5$. The node identifiers for Nodes $N_3$, $N_6$ and $N_7$ also include two integer values correspond to their respective range of index values shown in FIG. 4. Because each leaf node represents a single triangle, the node identifiers for each leaf node includes the same two integer values. For example, the node identifier (1,1) for leaf node $O_1$ corresponds to a range of one index value used to store the material data for the first triangle.

By assuming the triangles are uniformly distributed in the direction of a ray, when the intersecting node is determined for the ray, the geometry (e.g., triangles bound by the intersecting node) is sampled from a list of the triangles represented by the node using uniform random sampling. That is, because the triangles are assumed to be uniformly distributed in the direction of the ray, the material data for any of the nodes in a bound group is uniformly sampled to randomly select the material to represent a triangle.

For example, FIG. 4 includes a triangle index buffer 406 with a plurality of values "XX" each representing a triangle index value (e.g., an index value from 1 to 8 in the example in FIG. 4). If a ray is determined to intersect Node $N_2$, index values 1 to 4 are uniformly sampled from the list of triangle index values for triangle index buffer 406 and one of the indices (e.g., index 4) is randomly selected from index values 1 to 4. The data for a triangle (e.g., the triangle corresponding to leaf node $O_1$) bound by Node $N_2$ stored at the selected index (e.g., index value 4) is then used for further shading. After a triangle is selected, the material data of the triangle used for shading is determined, for example, via a look up table. The sampling is, for example, performed at runtime for each ray.

Stochastic sampling is also used to obtain the texture coordinates for the location of the intersecting node. For example, a barycentric coordinate in the selected triangle is sampled and used to interpolate the texture coordinates of the vertices.

The techniques described above does not make any assumptions about the material on the geometry. Accordingly, the features of the present disclosure work well for complex materials within a shading network, and can be used to filter materials of the geometry.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of ray tracing using multi-resolution geometric representations, the method comprising:
   casting a ray in a space comprising objects represented by geometric shapes;

approximating a volume of the geometric shapes using an accelerated hierarchy structure, the accelerated hierarchy structure comprising:
  first nodes each representing a volume of one of the geometric shapes in the space; and
  second nodes each representing an approximate volume of a group of the geometric shapes; and
when the ray is determined to intersect a bounding box of at least one of the second nodes, selecting between traversal and non-traversal of other second nodes based on a comparison of a level of detail (LOD) representing a respective volume of the group of geometric shapes with a LOD threshold.

2. The method of claim 1, wherein the space is a three dimensional (3D) space in a scene.

3. The method of claim 1, wherein the accelerated hierarchy structure is a bounding volume hierarchy (BVH) structure, and
  the first nodes are leaf nodes each representing one of the geometric shapes; and
  the second nodes comprise multiple hierarchies of non-leaf nodes each representing an axis-aligned bounding box (AABB) which bounds the volume of the group of geometric shapes.

4. The method of claim 1, wherein selecting between the traversal and the non-traversal of the other second nodes comprises:
  determining whether or not a volume of the bounding box is sufficient for representing a volume of the group of geometric shapes bound by the second nodes.

5. The method of claim 1, further comprising:
  when the ray is determined not to intersect the bounding box of the second nodes, not traversing sub-nodes of the second nodes.

6. The method of claim 1, further comprising:
  when the LOD is equal to or less than the LOD threshold, not traversing sub-nodes of the second nodes and using data of the second nodes to represent the volume of the group of geometric shapes; and
  when the LOD is greater than the LOD threshold, not using the data of the second nodes to represent the volume of the group of the geometric shapes and traversing the sub-nodes of the second nodes.

7. The method of claim 1, wherein the LOD threshold is determined at runtime.

8. The method of claim 1, further comprising
  when the ray is determined to intersect the bounding box, determining the LOD, for representing the volume of the group of geometric shapes, as an angle between a first vector extending from a ray origin to a center of a sphere around the bounding box and a second vector extending from the ray origin to a surface of the sphere.

9. The method of claim 8, wherein
  the LOD threshold is a threshold angle and the method further comprises;
  when the angle is equal to or less than the threshold angle, stopping traversal of sub-nodes of the second nodes and using data of the second nodes to represent the volume of the group of geometric shapes; and
  when the angle is greater than the angle threshold, not using the data of the second nodes to represent the volume of the group of geometric shapes and continuing the traversal of the sub-nodes of the second nodes.

10. The method of claim 1, further comprising:
  determining material data for representing one of the geometric shapes by selecting the material data, of any one node in a group of nodes representing one geometric shape among the geometric shapes, using node identifiers which include index values used to store data of a first triangle and last triangle represented by each node in the group.

11. A processing device for ray tracing using multi-resolution geometric representations, the processing device comprising:
  memory; and
  one or more processors that are communicatively coupled to the memory, wherein the one or more processors are collectively configured to:
  cast a ray in a space comprising one or more objects represented by the geometric shapes;
  approximate a volume of the geometric shapes using an accelerated hierarchy structure, the accelerated hierarchy structure comprising:
    first nodes each representing a volume of one of the geometric shapes in the space; and
    second nodes each representing an approximate volume of a group of the geometric shapes in the space; and
  when the ray is determined to intersect a bounding box of at least one of the second nodes, perform a selection between traversal and non-traversal of other second nodes based on a comparison of a level of detail (LOD) representing a respective volume of the group of geometric shapes with a LOD threshold.

12. The processing device of claim 11, wherein the accelerated hierarchy structure is a bounding volume hierarchy (BVH) structure, and
  the first nodes are leaf nodes each representing one of the geometric shapes; and
  the second nodes comprise multiple hierarchies of non-leaf nodes each representing an axis-aligned bounding box (AABB) which bounds the volume of the group of geometric shapes.

13. The processing device of claim 11, wherein the selection is further performed based on whether or not a volume of the bounding box is sufficient for representing a volume of the group of the geometric shapes bound by the second nodes.

14. The processing device of claim 11, wherein the one or more processors are further collectively configured to:
  when the ray is determined not to intersect the bounding box, not traverse sub-nodes of the second nodes.

15. The processing device of claim 11, wherein the one or more processors are further collectively configured to:
  when the LOD is equal to or less than the LOD threshold, not traverse sub-nodes of the second nodes and using data of the second nodes to represent the volume of the group of geometric shapes; and
  when the LOD is greater than the LOD threshold, not using the data of the second nodes to represent the volume of the group of the geometric shapes and traverse the sub-nodes of the second nodes.

16. The processing device of claim 11, wherein the LOD threshold is determined at runtime.

17. The processing device of claim 11, wherein the one or more processors are further collectively configured to,
  when the ray is determined to intersect the bounding box, determine the LOD, for representing the volume of the group of geometric shapes, as an angle between a first vector extending from a ray origin to a center of a sphere around the bounding box and a second vector extending from the ray origin to a surface of the sphere.

18. The processing device of claim 17, wherein the LOD threshold is a threshold angle and the one or more processors are further collectively configured to:
- when the angle is equal to or less than the threshold angle, stopping traversal of sub-nodes of the second nodes and using data of the second nodes to represent the volume of the group of geometric shapes; and
- when the angle is greater than the angle threshold, not using the data of the second nodes to represent the volume of the group of geometric shapes and continuing traversal of sub-nodes of the second nodes.

19. The processing device of claim 11, wherein the one or more processors are further collectively configured to:
- determine material data for representing one of the geometric shapes by selecting the material data, of any one node in a group of nodes representing one geometric shape among the geometric shapes, using node identifiers which include index values used to store data of a first triangle and last triangle represented by each node in the group.

20. A non-transitory computer readable medium comprising instructions for performing ray tracing using multi-resolution geometric representations, the instructions when executed by a one or more processors cause the one or more processors to collectively execute a method comprising:
- casting a ray in a space comprising objects represented by geometric shapes;
- approximating a volume of the geometric shapes using an accelerated hierarchy structure, the accelerated hierarchy structure comprising:
  - first nodes each representing a volume of one of the geometric shapes in the space; and
  - second nodes each representing an approximate volume of a group of the geometric shapes; and
- when the ray is determined to intersect a bounding box of at least one of the second nodes, selecting between traversal and non-traversal of other second nodes based on a comparison of a level of detail (LOD) representing a respective volume of the group of geometric shapes with a LOD threshold.

* * * * *